Jan. 9, 1945. I. G. FOWLER ET AL 2,367,111

METHOD OF PRODUCING OPTICAL ELEMENTS

Filed Aug. 24, 1943

Inventors
IVAL G. FOWLER.
HAROLD A. McMASTER

Frank Fraser
Attorney

Patented Jan. 9, 1945

2,367,111

UNITED STATES PATENT OFFICE 2,367,111

METHOD OF PRODUCING OPTICAL ELEMENTS

Ival G. Fowler and Harold A. McMaster, Toledo, Ohio, assignors to Libbey-Owens-Ford Glass Company, Toledo, Ohio, a corporation of Ohio Application August 24, 1943, Serial No. 499,788

14 Claims. (Cl. 154—2.73)

The present invention relates to the production of precision glass units and other optical elements, and more particularly to a method for improving the surface precision of thermoplastic materials.

The invention is based on the discovery and development of a technique, or optical process, whereby pieces of a thermoplastic material such as glass, which have an optically satisfactory surface finish but do not have the exact outline or contour of surface required, can have the shape of their surfaces changed to conform to a definite pattern within a fraction of an interference fringe, observed under monochromatic light. And this without injuriously affecting the surface finish of the material.

Basically, the technique involves the bringing together of two surfaces, one of which it is desired to fit or cause to conform to the other, and then applying pressure to urge the surfaces into agreement, in the presence of sufficient heat to relieve the strain set up by the pressure but without softening the surfaces. When this treatment is continued for a predetermined length of time, the surfaces will be found to have been brought into essential contact and will remain so after the pressure is removed. In actual practice on commercial production, flat surfaces exhibiting 100 interference fringes, when placed together and examined in mercury light, have their lack of conformity reduced to less than 5 fringes. And where necessary, closer tolerances can be maintained.

There are two principal situations in which the method of the invention has particular utility. The first is in a case where two blanks or pieces are to be made into a composite, precision unit and it is necessary that the two outer surfaces of the unit have contours that precisely match one another. The other is where a true master surface is to be duplicated. In the first instance, the contour of either one or both surfaces must be changed to cause them to fit together, while in the second the contour of one surface is changed to conform to a permanent or fixed surface contour.

In either case, optical or precision elements produced according to the invention meet rigid specifications as filters for aerial cameras, precision observation instruments and binoculars; as lenses of various kinds; observation windows or cover plates for high precision instruments; back and front surfaced mirrors, for use in bomb sights or instead of reflecting prisms in optical instruments; and, in fact, any and all transparent or reflecting viewing or observation elements where exceptionally good definition and improved surface precision is found to be either necessary or desirable.

Heretofore, the making of viewing or sighting elements for optical instruments has involved complicated optical processes, starting with the making of the rough blanks and continuing through the laborious, expensive and time consuming processing treatment necessary to produce finished elements having the required surface precision. For example, the final shaping and finishing of the surfaces has been effected by a series of delicate grinding and polishing operations, which are largely hand work and require special equipment. Highly skilled personnel has also been essential because, in effect, each piece was produced as an individual custom job and the accuracy of the completed element depended almost entirely on the trained judgement of the workman.

In the present emergency, there is an unusual and urgent demand for large quantities of optical glass and also for all types of viewing elements to be used in military observation and sighting instruments. Skilled labor and precision machinery of any kind are now at a premium and the amount of equipment and skilled craftsmen that are normally available in the optical field is quite small. At its best it is totally inadequate to meet the present unprecedented requirements and as a consequence there is a serious shortage of instruments, vitally essential to the prosecution of the war.

It is an aim of our invention to relieve this condition by the provision of a method for producing optical and precision elements that is adaptable to large scale mass production, which utilizes relatively cheap and easily produced blanks, and which does not require the services of highly skilled or specially trained workmen.

An outstanding feature of the invention arises from the discovery of a method whereby the surface of a thermoplastic body can be altered so that it will match precisely with, or conform to, the contour of another surface without injuring the finish of either one. Because of this it is no longer necessary, when producing optical elements, that the final and exact surface contour and surface finish be produced in one operation, by the expensive and time-consuming method of grinding and polishing or lapping of the surface. Instead, the surface can be ground and polished or otherwise finished first before it is finally shaped, and this is a relatively simple matter. The exacting job of forming the precision contour on the surface can then be accomplished after the grinding and polishing operation.

According to the invention this is done by causing the finished surface to fit with or conform to a second surface under the action of controlled pressure and heat while in direct engagement with the second surface. By this means, a true optical unit can be produced from one or more pieces of material that, prior to the treatment, had no utility for such a purpose because of a lack of surface precision.

Consequently, the invention makes it possible in many instances to use materials that are comparatively cheap and plentiful, in lieu of optically ground and polished glass. For example, regular commercial plate glass, which is available in practically unlimited quantites at low cost, has proved very satisfactory for use in making flat optical viewing elements. Blanks may be cut from the ground and polished plates which have a good surface finish, and it is then only necessary to improve their surface precision by providing matching surfaces on two pieces that are to be used together, or by causing the surface of the blank to conform to a master surface.

One well known precision unit that can be produced in this way is a light filter of laminated glass. It is well known that commercial laminated safety glass, made with regular ground and polished plate glass, has optical properties that are entirely satisfactory for the purposes to which it is put; that is, in automobile windows, windshields and so forth. But these glass-plastic sandwiches will not meet the requirements for sight elements in optical instruments because they lack the precision resolving power characteristics necessary for high precision work. In other words, they do not have the ability to render closely separated lines clearly distinguishable when observed through the sandwich under power, as with a telescope.

However, it has been found that the resolving power characteristics of multiple thicknesses of ground and polished plate glass, laminated with a plastic interlayer, are remarkably improved if the exterior surfaces of the glass plates have surface contours which precisely match each other. In fact, when this is the case and the plastic is the proper color, such laminated glass elements make exceptionally good light filters for such high precision instruments as aerial cameras and binoculars.

To be satisfactory for this purpose, the outer surfaces of the glass pieces in the sandwich must not only have matching contours but these contours must also be essentially parallel. It has previously been suggested that this condition be arrived at, or rather approximated, by selecting and pairing up matching pieces through visual inspection. The difficulty is that, while the difference in surface contour between two pieces of ground and polished plate glass is considerable from an optical point of view, it is so small dimension-wise as to be indistinguishable to the naked eye in ordinary light.

Consequently, the classifying and matching of the surface contours must be done by observing the appearance and number of interference fringes as seen under monochromatic light and this type of critical inspection is a laborious and costly process. In addition, only a small percentage of the number of pieces that it is possible to cut from a large plate can be matched closely enough to give the required optical precision.

On the other hand, with our invention pieces of plate glass, picked at random, can be put together in pairs. It is then only necessary to subject them to the proper pressure and temperature cycle in order to fit the contours of the inner or engaging surfaces together. These inside surfaces will thus be matched precisely and, by subsequently reassembling to make them the outer surfaces of a glass-plastic sandwich, a unit having the improved optical characteristics described above will be obtained. Besides the simplicity and economy of this method as compared to other known methods of accomplishing like results, it also makes possible the use of practically all of the glass pieces that can be cut from a large plate.

Other objects and advantage of the invention will become more apparent during the course of the following description, when taken in connection with the accompanying drawing.

In the drawing, wherein like numerals are employed to designate like parts throughout the same:

Figure 1:
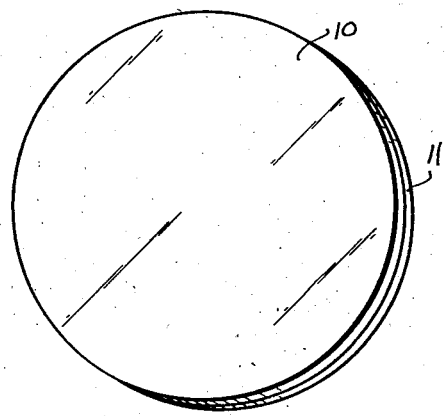
Fig. 1 is a perspective view of a pair of blanks in the form of flat, circular pieces of plate glass intended to be ultimately incorporated into a laminated safety glass light filter according to the invention.

Referring more specifically to the drawing, in Figs. 1 to 6, there has been illustrated the method of producing disc-shaped light filters of laminated safety glass, and for this purpose regular commercial ground and polished plate glass is preferably used. The large plates are cut up into circular pieces of the desired size, and one surface of each piece is very carefully washed and cleaned to completely remove all foreign particles.

Figure 2:
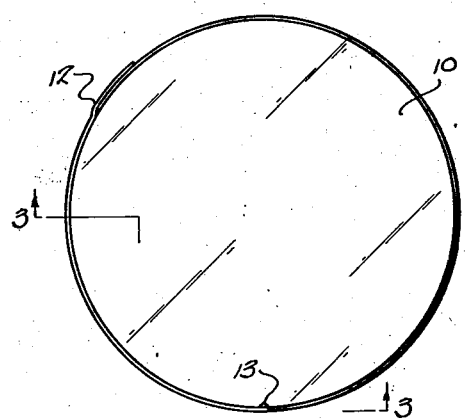
Fig. 2 is a plan view of the pieces of Fig. 1 after being cleaned, taped together, and notched for identification and orientation.
Figure 3:
Fig. 3 is a view, partially in section, taken along the line 3—3 in Fig. 2.

The circular pieces are then assembled in pairs (10 and 11 in Fig. 1) with their thoroughly cleaned surfaces in engagement with one another and secured together by a narrow strip of adhesive tape 12 or the like, around and adhered to the edges of both pieces (Figs. 2 and 3). The next step is to mark or brand the pieces for identification and for later alignment of orientation during reassembly. This marking is preferably done by grinding two small notches, one in the edge of each piece and in alignment with one another as at 13 and 14 in Fig. 3.

Figure 4:
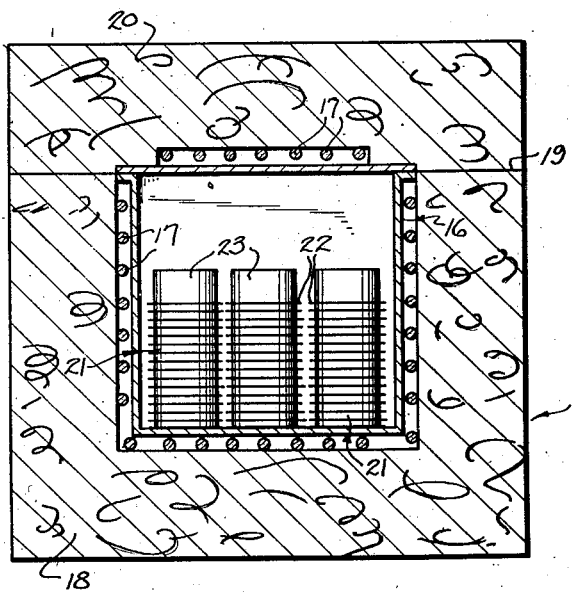
Fig. 4 is a vertical section through a heating chamber, within which the pressure and temperature treatment can be carried out, and showing a number of units in position.

The assembled pieces are now ready to have their inner surfaces matched or fitted to each other by pressure and heat, and a suitable oven of a type that has actually been used for this purpose is shown at 15 in Fig. 4. The oven comprises a box-like heating chamber 16 entirely surrounded by electrical heating elements 17 and covered with a heavy layer of insulating material, such as asbestos, at 18. The entire unit is divided along the line 19 to provide a cover 20 which can be removed to permit charging and unloading of the chamber 16.

When making these disc-shaped elements, a large number of assembled pairs or units can be treated at the same time, if desired, by stacking them in piles one on top of another as at 21. When this is done, however, it has been found necessary to use a layer of cushioning material, such as a sheet of asbestos, 22 between each unit or assembled pair in order to allow independent movement of the assemblies relative to one another and to transmit pressure uniformly through the pile. Pressure is then applied to all of the units simultaneously, and one way in which this can be done is by means of weights 23 placed upon the top of each stack or pile 21.

As already explained, it is intended that the adjacent or inside surfaces 24 and 25 of each pair of glass discs will have their contours fitted to one another, to provide precisely matching surfaces, by the action of controlled pressure and heat. The pressure used must be sufficient to urge the adjacent surface contours into agreement, without causing cohesion of the glass surfaces, and the temperature must be within the annealing range of the glass, at a point below the softening point but sufficiently high to relieve the strain set up by the pressure, which strain tends to spring the surfaces apart.

It will be understood that the surfaces of all of the discs even before treatment appear to be perfectly flat when viewed alone or in ordinary light and that the difference in contour between adjacent surfaces of the assembled pairs, while vitally important from the standpoint of optical precision, is so slight as to necessitate its being expressed in terms of interference fringes. For example, a pair of discs to be treated may have adjacent surfaces that are spherically concave to an extent exhibiting only 100 circular interference fringes in mercury light but, to be optically satisfactory, it is required that they be brought into agreement within approximately two fringes.

According to the invention this surface agreement can be obtained by arranging one of the assembled and taped pairs of glass discs, together with other pairs, in a stack 21 in the oven 15 with soft, previously burned sheet asbestos between each pair. A weight 23, sufficiently heavy to bring the inside surfaces 24 and 25 of each pair into contact with one another within one interference fringe, is then placed on top of the pile. The meeting glass surfaces are thus brought into virtual contact, and we have found that if the strain set up by the pressure, and which would normally force the surfaces apart if the pressure were removed, is relieved these surfaces can be made to permanently retain their new contours and relationship.

Accordingly, when the heating chamber 16 has been fully charged, the cover 20 is put in place and the oven gradually heated up to a point, within the annealing range of the glass, which is sufficiently high to relieve the strain. In the case of ordinary crown glass a temperature of 1000 degrees Fahrenheit has been found satisfactory for the purpose, and if held constant for a few hours will reduce the strain to a point where it will not spring the surfaces apart by more than two fringes when the pressure is removed.

The same result can also be secured in a slightly different manner by utilizing a lower pressure over a longer period of time. Thus, if a pressure which is only sufficient to reduce the number of interference fringes from 100 to 50 is employed, the remaining 50 fringes will gradually disappear at a holding temperature of 1000 degrees Fahrenheit, until the meeting glass surfaces 24 and 25 come into contact, after which the strain is relieved as in the first case.

In bringing the glass pieces up to the holding temperature, it is important that the heating be gradual so that the glass will not be broken or injured by a sudden change in temperature. After the surface contours have been permanently fitted to one another, it is equally important that the glass be cooled slowly, through the annealing range, to prevent introduction of thermal strains which will warp the surfaces in such a way that they will no longer agree when they reach room temperature.

In fact, the factors of pressure, temperature and time, and their control, are of prime importance in carrying out this novel method of improving the surface precision of materials. Any, or all three factors, will of course have to be varied to a greater or less extent between materials of different thermoplastic characteristics. And, as shown above in treating plate glass, it is possible to proportionately vary two or more factors even in treating the same material or materials of closely similar characteristics, because changes in one or the other of the factors of temperature, pressure and time can, to some extent, be compensated for by varying one or both of the other factors.

It is well to establish a definite relationship among the three factors in treating each different material and the fact that there is a permissible extent of variation and compensation makes it possible to set up a cycle of maximum efficiency. For example, it is of course desirable in commercial production to cut down as much as possible on the time factor. However, the extent to which this can be done will, of necessity, be controlled by the amount of temperature and pressure that can be applied without injuring either the pieces themselves or their optical surfaces, and also by the rate at which the heating and cooling can progress without causing trouble, since these latter factors will have to be increased to compensate for any reduction in the time element.

In this connection, it has been found that if the holding time at the maximum temperature is too long, or the temperature is too high, the polish of the outer surfaces of the pairs of discs will be destroyed and the inner or contacting surfaces will stick together. Another important point is that the time spent in the annealing range during cooling reflects back on the time spent at the constant holding temperature. For his reason, when the cooling (in the annealing range) is prolonged, the holding time must be correspondingly shortened and, for every cooling rate, there is a maximum temperature at which the holding time is zero. In other words, in determining the length of time that a material can remain under heat without injuring its surface, it is necessary to take into consideration, not only the time spent at the constant holding temperature but also that part of the cooling time that is within the annealing range.

Because of the difference in the thermoplastic properties of the various glass and plastic materials that can be processed according to this invention, it is impractical to set up any single set of figures as to temperature, pressure and time that would be applicable to all, or to arbitrarily define critical ranges, except in a general way. The proportionate ranges of the three factors of pressure, temperature and time for each material, or group of similar materials, are nevertheless highly important and have a definite bearing on the successful practice of the method.

To illustrate, when using blanks made from plates of ground and polished, low iron crown glass having an approximate composition of 72% $SiO_2$, 13½% CaO, 13½% $Na_2O$, and 1% $Sb_2O_5$, a typical choice of pressure, temperature and time which is applicable to 4-inch discs, $\tfrac{3}{16}$ inch thick, and gives a high yield of surfaces agreeing to less than three fringes is as follows:

Apply a 15 pound weight to a stack of 25 pairs of discs separated by soft sheet asbestos previously burned.
Heat to 1000° F.
Hold 1000° F. for 6 hours.
Cool at the rate of 5° per hour for 16 hours.
Cool at the rate of 7.5° per hour for 4 hours.
Cool at the rate of 10° per hour for 4 hours.
Cool at the rate of 15° per hour to 700° F.
Below 700° F. any cooling rate which will not break the glass is satisfactory.

Upon completion of the above treatment and removal of the pairs of discs from the oven, it will be found that the meeting surfaces of each pair are in essential contact throughout their areas and thus have precisely matching contours. The accuracy requirements for regular commercial production usually permit a lack of conformity between matching surfaces up to 4 or 5 interference fringes. However, using the pressure, temperature and time cycle given above and substituting a very light layer of dust, for the asbestos sheets as the cushioning means between pairs, the meeting surfaces of six inch glass discs have been made to conform to one another within a fraction of an interference fringe.

Figure 5:
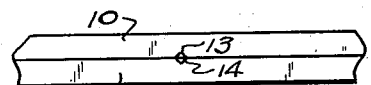
Fig. 5 is a fragmentary view similar to Fig. 3 after reassembly of the glass pieces with the matched surfaces on the outside.

The next step is to separate the two pieces 10 and 11 and reassemble them with their matching surfaces to the outside, but with the notches 13 and 14 in alignment as shown in Fig. 5, to insure proper orientation of the matching contours relative to one another.

Figure 6:
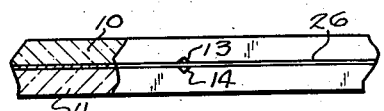
Fig. 6 is a fragmentary view of a finished precision element of laminated safety glass.

As the final step, the two pieces 10 and 11 are laminated together, with an interposed layer of plastic 26 of the desired color, and without changing their relative positions (Fig. 6). The result is a precision element of laminated safety glass, adaptable for use as a light filter and having excellent definition and resolving power characteristics.

By substituting a colorless plastic for the layer 26, the element can be used for other purposes wherever the characteristics of good definition are desired. And, in cases where an optical or precision element of the above character must have controlled deviation, as well as good definition, this can also be achieved by employing blanks or pieces that have first been selected for this property.

Figure 7:
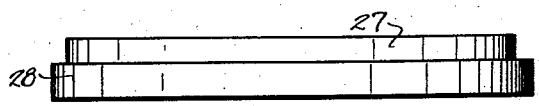
Fig. 7 is a view of blank mounted on an optical flat preparatory to introduction in the heating chamber.

As indicated above, in addition to the fitting together of two surfaces in the manner just described, the invention also contemplates the reproduction of a true master surface on the face of a thermoplastic blank. The simplest form of this phase of the invention is in treating a piece of plate glass to provide it with an optically flat surface as illustrated in Fig. 7. This is preferably accomplished by placing a ground and polished glass blank 27 upon a true optical flat 28, to be used as a die, and which is less susceptible to deformation under the pressure and temperatures used than is the glass blank. Pressure and heat are then applied, in the manner already set forth, to cause the surface of the blank 27 to permanently conform to that of the optical flat 28.

Blanks that have received this treatment will have a surface that is much flatter than can be obtained in ordinary plate glass production and, in fact, one that is comparable to that of a true optical flat, produced by the laborious grinding and polishing method. They can be used singly as precision elements, in some optical instruments, or may be laminated in pairs for other purposes. If the blanks are first selected for parallelism and, after being given a flat surface, are laminated with another blank that has been treated in the same manner, an optically flat, precision element of laminated safety glass, having controlled deviation, is obtained.

Another important use for this phase of the invention is in the reclaiming of pieces that have been selected for parallelism but which are subsequently rejected for lack of flatness.

In all of the specific examples so far discussed, only so-called flat glass has been considered, but all of the described methods could, with obvious modifications, be applied to optical or precision elements having surfaces that are curved or otherwise shaped. For example, differently shaped surfaces of precision quality can be produced in the manner of the optically flat surfaces by using a blank approximating the desired shape and placing it against a die provided with a surface of the exact form required.

This procedure is adaptable not only to blanks but to relatively cheap lenses, which can have their surface precision so far improved as to render them the counterpart of much more expensive lenses, by the same treatment.

It is to be understood that the forms of the invention herewith shown and described are to be taken as preferred embodiments of the same, but that various changes in the shape, size and arrangement of parts may be resorted to without departing from the spirit of the invention or the scope of the subjoined claims.

We claim:

1. The method of matching a surface on a thermoplastic body with another surface, comprising placing the two surfaces together, applying pressure to urge said surfaces into contact, subjecting said thermoplastic body to controlled heating within the annealing range of the thermoplastic, continuing said pressure and heat after the two surfaces are in essential contact until they will remain so without pressure, and then cooling said body and releasing said pressure.

2. The method of improving the surface precision of thermoplastic materials, comprising positioning a body of a thermoplastic material with one surface of said body against a surface of greater precision which will resist deformation at temperatures within the annealing range of said thermoplastic, applying pressure to urge the surface of the thermoplastic body into conformance with the surface of greater precision, subjecting said thermoplastic body to controlled heating within the annealing range of the thermoplastic, continuing said pressure and heat until the surface on the thermoplastic body is in essential contact with the surface of greater precision and will remain so without pressure, and then cooling said body and releasing said pressure.

3. The method of fitting the contour of a surface on a thermoplastic body to the contour of a surface on another thermoplastic body, comprising placing the two surfaces together, applying pressure to urge said surfaces into conformation with each other, subjecting said bodies to controlled heating within the annealing range of the thermoplastic, continuing said pressure and heat after the two surfaces are in essential contact until they will remain so without pressure, and then cooling said bodies and releasing said pressure.

4. The method of matching a surface on a thermoplastic body with another surface, comprising placing the two surfaces together, applying pressure to urge said surfaces into contact and which will set up a strain within the thermoplastic body tending to spring said surfaces apart, subjecting said body to controlled heating within the annealing range of the thermoplastic to relieve said strain, continuing said pressure and heat after the surfaces are in essential contact until the strain has been reduced to a point where it will not spring said surfaces apart beyond a predetermined distance when the pressure has been released, and then cooling said body and releasing said pressure.

5. The method of fitting surface contours on two thermoplastic bodies to one another, comprising placing two of the surfaces together, applying pressure to urge said surfaces into contact and thereby setting up a strain which tends to spring said surfaces apart, subjecting said thermoplastic bodies to controlled heating within the annealing range of the thermoplastic to relieve said strain, continuing said pressure and heat after the two surfaces are in essential contact until the strain has been reduced to a point where it will not spring said surfaces apart beyond a predetermined distance when the pressure is released, and then cooling said bodies and releasing said pressure.

6. The method of improving the surface precision of thermoplastic materials, comprising positioning a body of a thermoplastic material having an optically satisfactory surface finish with one finished surface of said body against a surface of greater precision and which is more resistant to deformation at temperatures within the annealing range of the thermoplastic, applying pressure to urge the finished surface of the thermoplastic body into conformance with the surface of greater precision and thereby setting up a strain within said body which tends to spring said surfaces apart, subjecting said thermoplastic body to controlled heating within the annealing range of the thermoplastic to relieve said strain, continuing said pressure and heat after the surface on the thermoplastic body is in essential contact with the surface of greater precision until it will remain so after the pressure has been released, and then cooling said body and releasing said pressure.

7. The method of matching a surface on a thermoplastic body with another surface, comprising thoroughly cleaning said surfaces to remove foreign particles, placing the thoroughly cleaned surfaces together, applying pressure to urge said surfaces into contact, subjecting said thermoplastic body to controlled heating within the annealing range of the thermoplastic including gradually increasing the heat to a maximum temperature and gradually reducing it from said temperature, extending said pressure and heat for a period after the two surfaces are in essential contact until they will remain so when the pressure has been released, then cooling said body and releasing said pressure.

8. In a method for producing optical elements, the steps of matching the contour of the surface of one thermoplastic body with the contour of the surface of a second thermoplastic body, comprising thoroughly cleaning said surfaces to remove foreign particles, placing the thoroughly cleaned surfaces together, applying pressure to urge said surfaces into contact, subjecting said thermoplastic bodies to controlled heating within the annealing range of the thermoplastic, continuing said pressure and heat after the two surfaces are in essential contact until they will remain so when the pressure has been released, and then cooling said body and releasing said pressure; reassembling said bodies with the matched surfaces to the outside while maintaining the orientation of the matching contours; and finally laminating the two bodies together in this relationship with a layer of plastic interposed therebetween.

9. The method of producing a light filter of laminated safety glass, comprising thoroughly cleaning a surface of each of two pieces of ground and polished plate glass to remove foreign particles, positioning the pieces with their thoroughly cleaned surfaces together and temporarily securing them in this relationship, applying pressure to urge said surfaces into contact, subjecting the glass pieces to controlled heating within the annealing range of the glass, continuing said pressure and heat after the two surfaces are in essential contact until they will remain so when the pressure has been released, cooling said body and releasing said pressure, separating said pieces and reassembling them with the inner surfaces to the outside but retaining the orientation of the contours of said surfaces, and finally laminating the two pieces together in this relationship with a layer of colored plastic interposed therebetween.

10. The method of improving the surface precision of a piece of ground and polished plate glass, comprising thoroughly cleaning one face of said piece to remove foreign particles, placing said face against the clean face of an optical flat that is resistant to deformation at temperatures within the annealing range of the glass piece, applying pressure to urge the face of the glass piece into contact with the face of said optical flat, subjecting the glass piece and the optical flat to controlled heating within the annealing range of the glass, continuing said pressure and heating after the face of the glass piece is in essential contact with the optical flat and until it will remain so when the pressure has been released, and then cooling the glass piece and optical flat and releasing the pressure.

11. The method of matching a surface on an unheated thermoplastic body with another surface, comprising placing the two surfaces together, applying sufficient pressure to force said surfaces into essential contact at room temperature and which sets up a strain that tends to spring said surfaces apart, subjecting said thermoplastic body to controlled heating within the annealing range of the thermoplastic to relieve said strain until it has been reduced to a point where it will not spring said surfaces apart beyond a predetermined distance when the pressure is released, and then cooling said bodies and releasing said pressure.

12. The method of matching a surface on an unheated thermoplastic body with another surface, comprising placing the two surfaces together, applying sufficient pressure to force said surfaces toward essential contact at room temperature and which sets up a strain that tends to spring said surfaces apart, subjecting said thermoplastic body to controlled heating within the annealing range of the thermoplastic, continuing said pressure and heat until the surfaces are brought into essential contact and the strain has been reduced to a point where it will not spring said surfaces apart beyond a predetermined distance when the pressure is released, and then cooling said bodies and releasing said pressure.

13. The method of matching a surface on a thermoplastic body with another surface, comprising placing the two surfaces together, applying pressure thereto, and elevating the temperature of said thermoplastic body to within its annealing range, the heat and pressure being such and for a length of time sufficient to bring the two surfaces into essential contact, which relationship will endure after the pressure is released.

14. In the production of optical elements, the method of accurately matching a surface on a glass body with another surface, including the steps of placing the two surfaces together, applying pressure to urge said surfaces into contact and to set up a strain within the glass, and then heating the glass body within the annealing range of the glass to relieve said strain.

IVAL G. FOWLER.
HAROLD A. McMASTER.